Aug. 22, 1939.  O. R. TERRY  2,170,699
FOUNTAIN PEN FILLING DEVICE
Filed Feb. 12, 1936  6 Sheets-Sheet 1
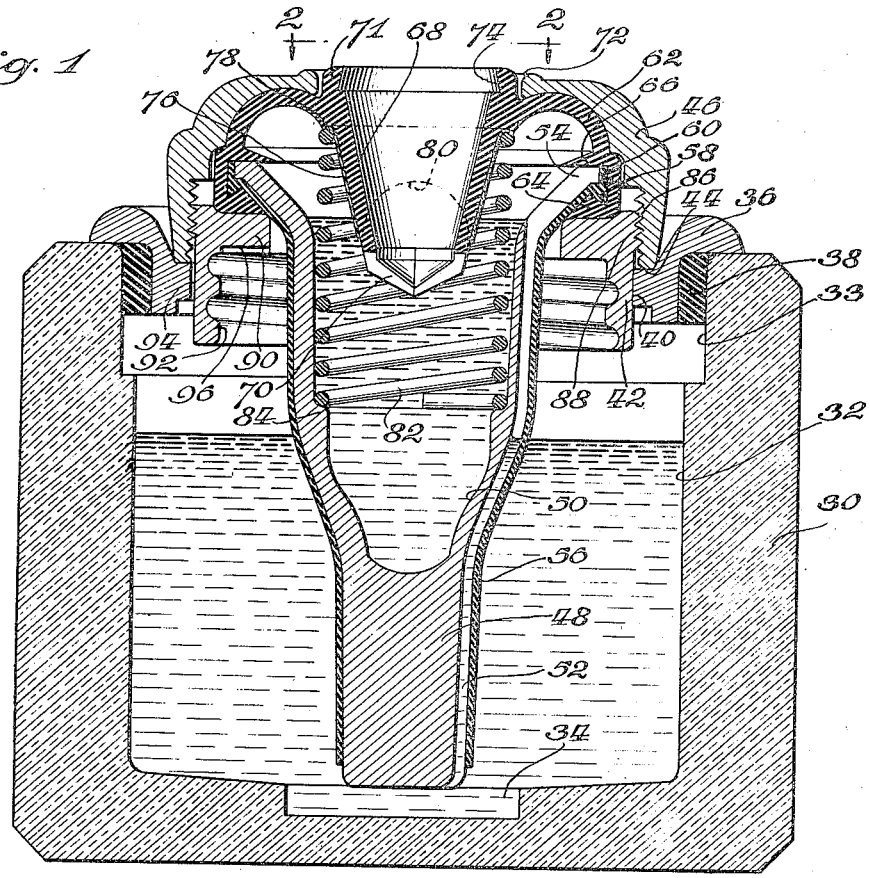
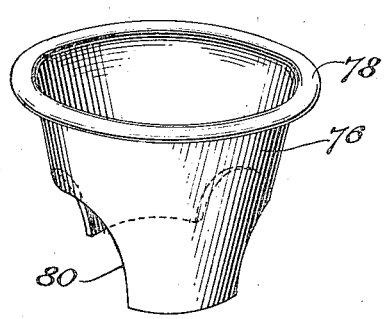
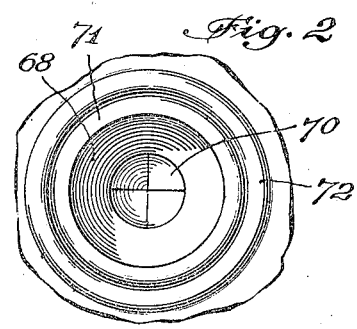
Inventor:
Owen R. Terry
By Williams Bradbury McCaleb & Hinkle
Attys.

Aug. 22, 1939.  O. R. TERRY  2,170,699
FOUNTAIN PEN FILLING DEVICE
Filed Feb. 12, 1936  6 Sheets-Sheet 2
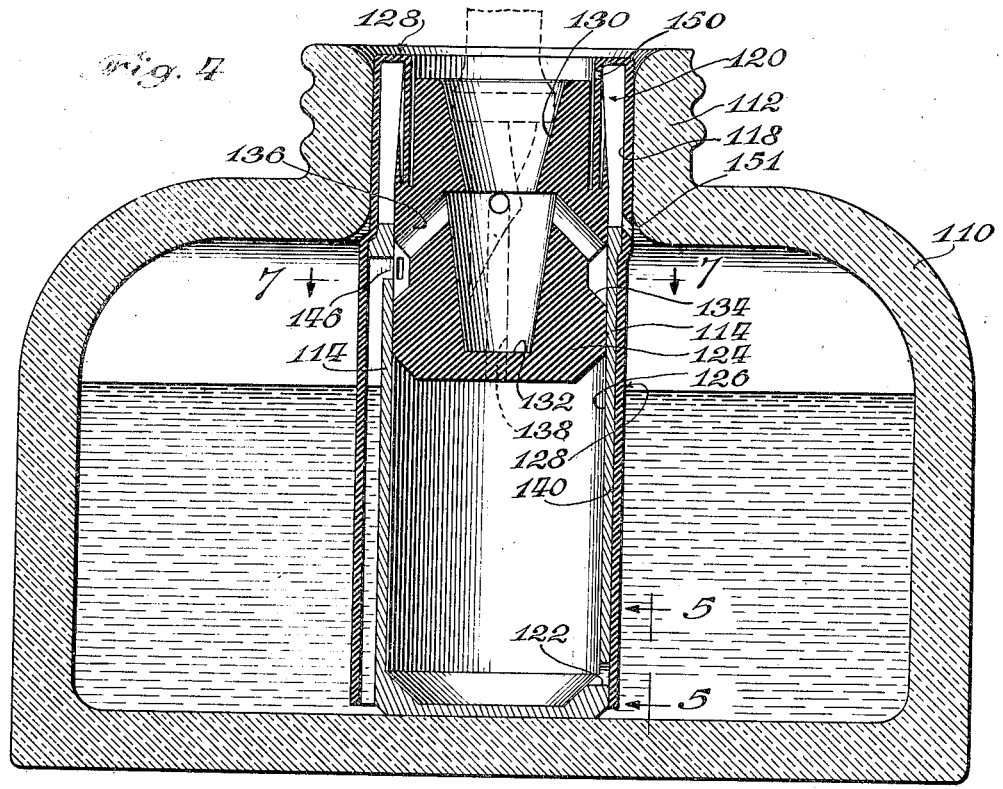
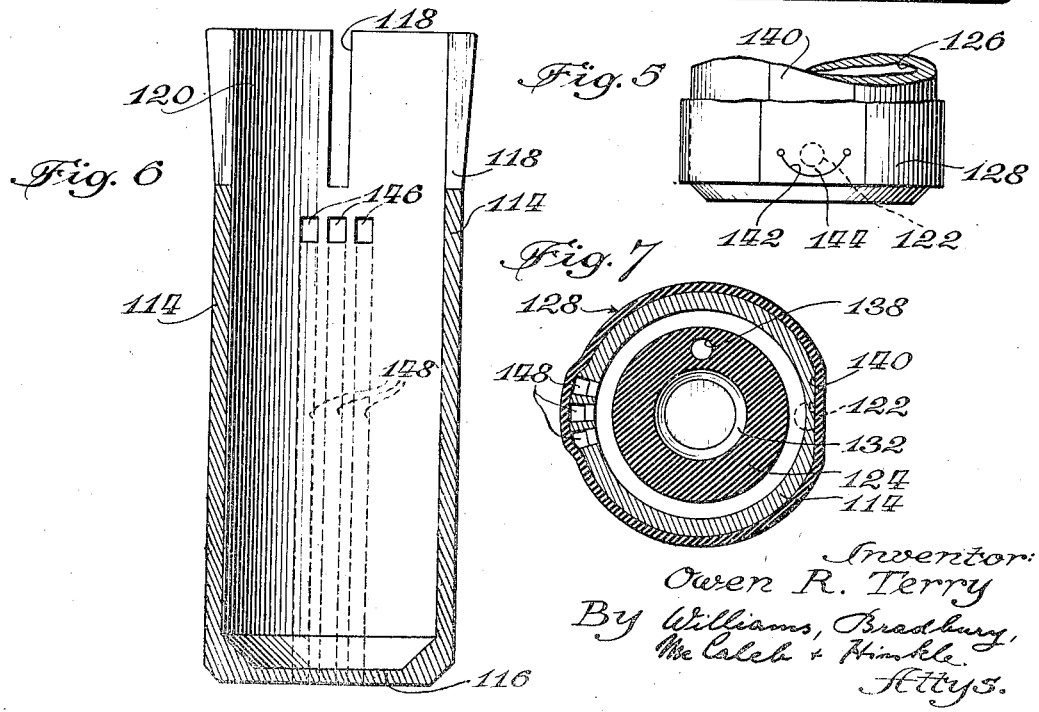
Inventor:
Owen R. Terry
By Williams, Bradbury,
McCaleb & Hinkle
Attys.

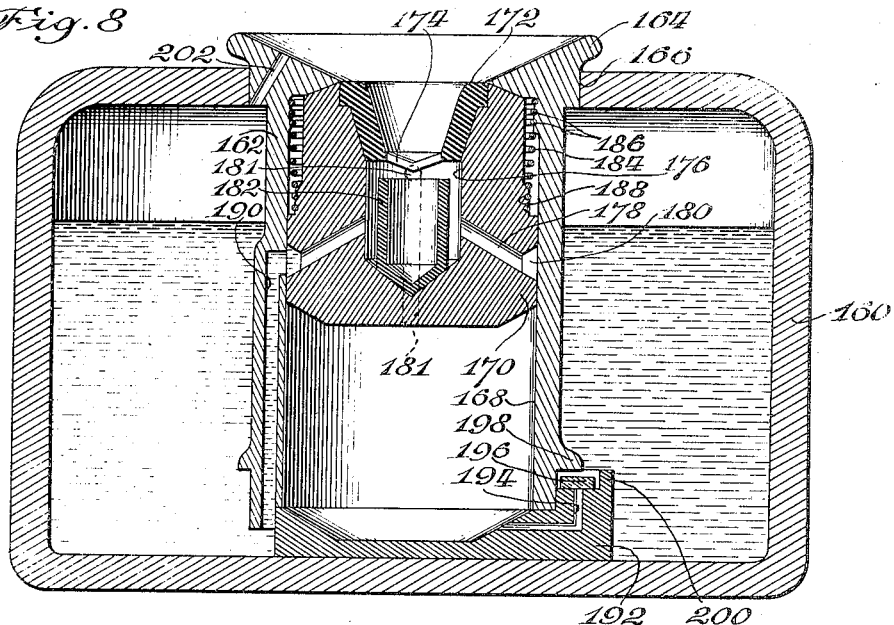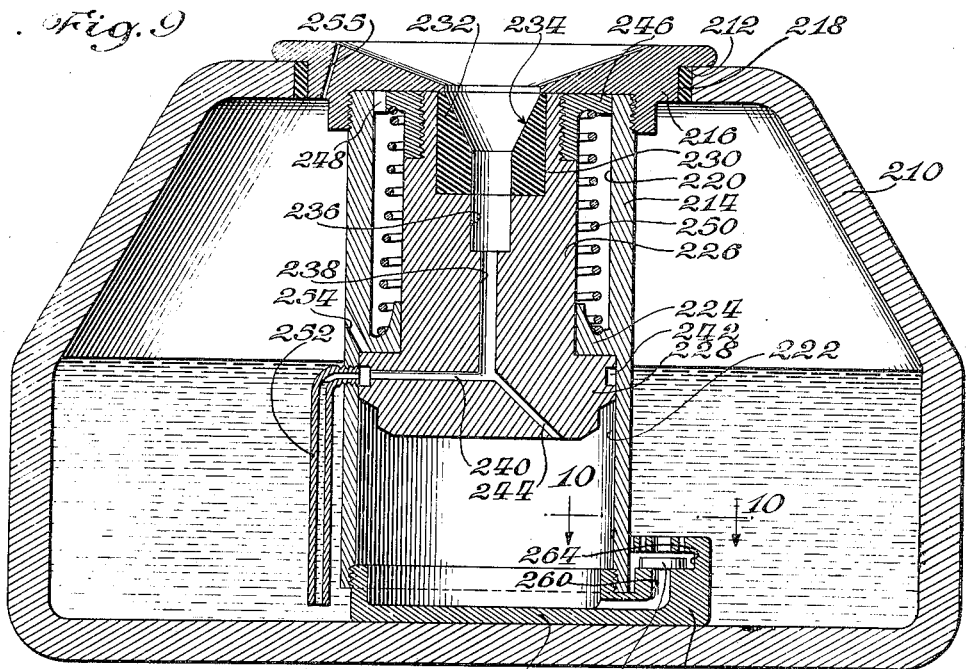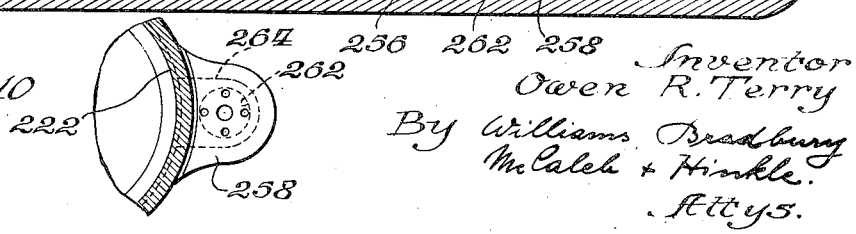

Aug. 22, 1939.  O. R. TERRY  2,170,699
FOUNTAIN PEN FILLING DEVICE
Filed Feb. 12, 1936  6 Sheets-Sheet 4
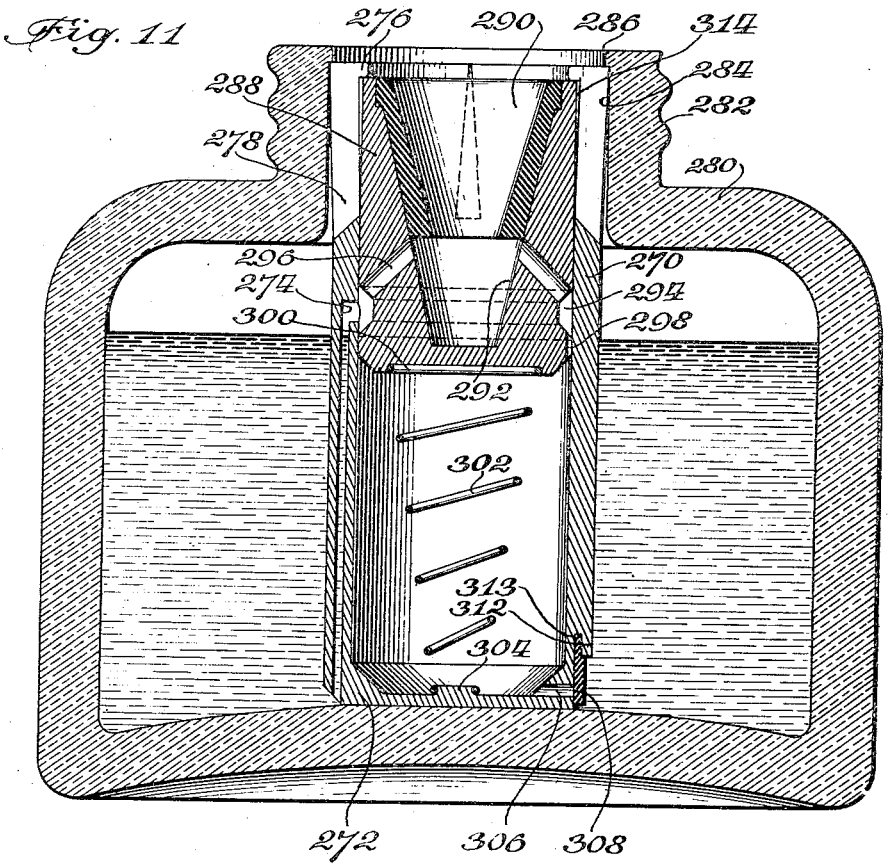
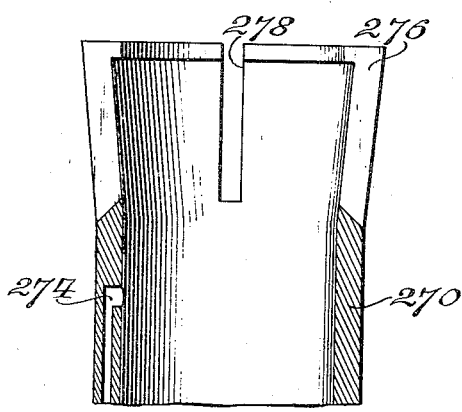
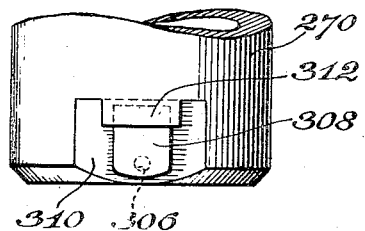
Inventor
Owen R. Terry

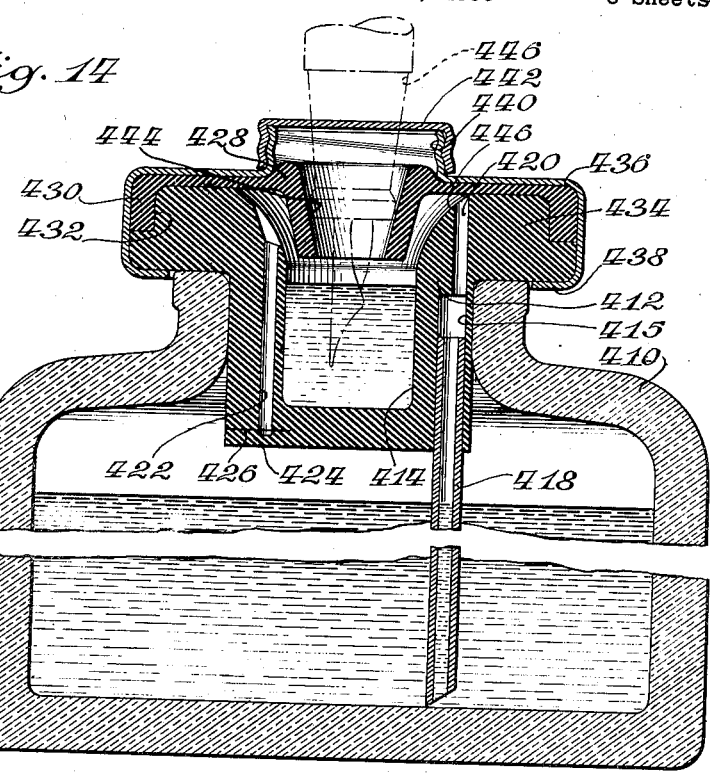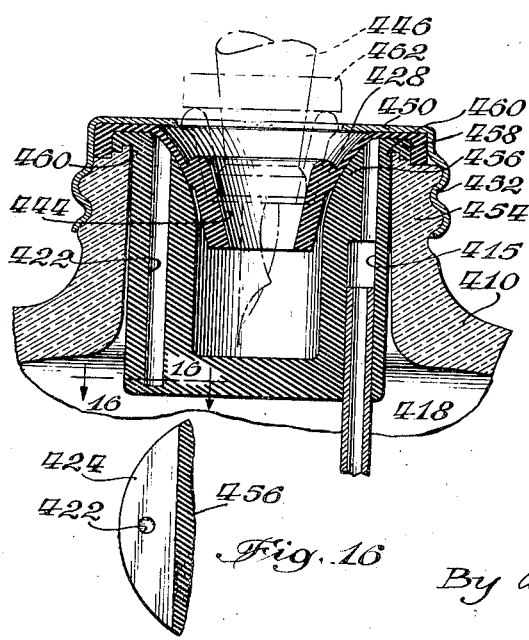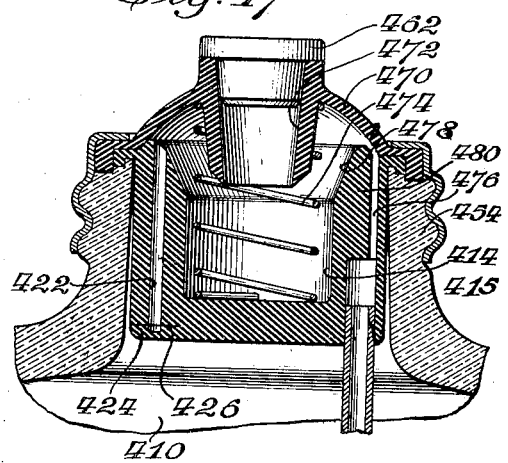

Aug. 22, 1939.   O. R. TERRY   2,170,699
FOUNTAIN PEN FILLING DEVICE
Filed Feb. 12, 1936   6 Sheets—Sheet 6
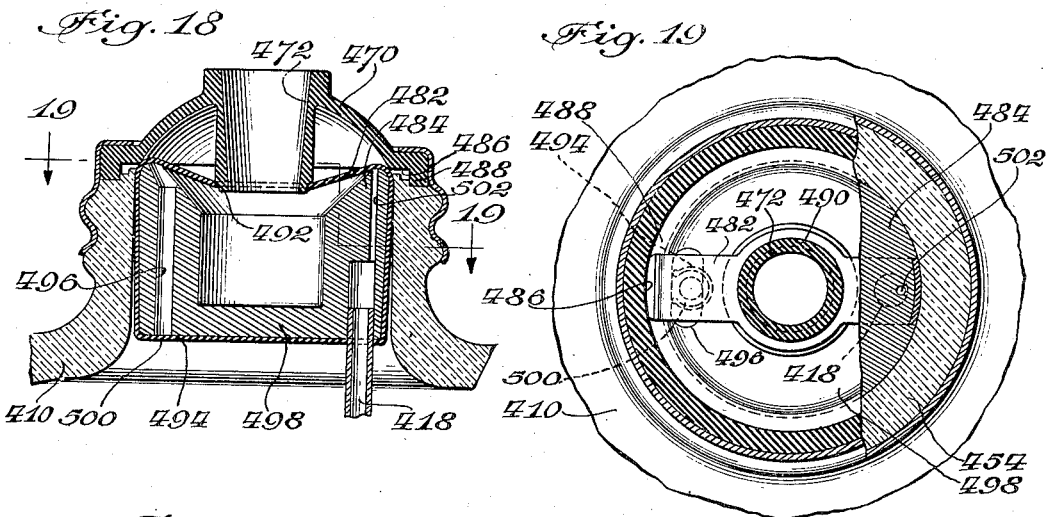
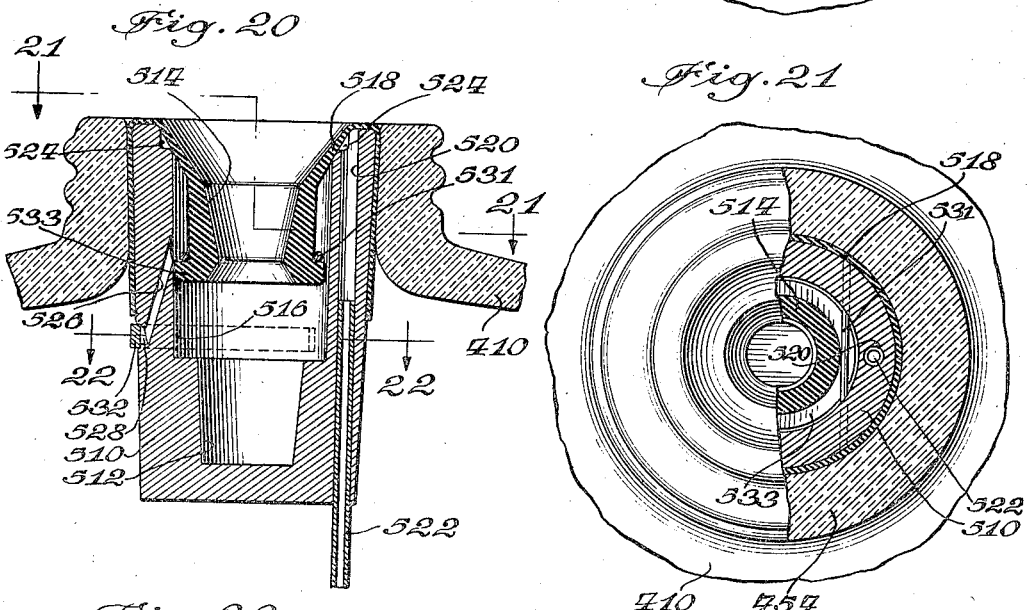
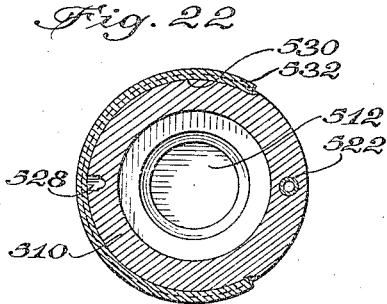
Inventor:
Owen R. Terry
By Williams, Bradbury, McCaleb & Hinkle
Attys.

Patented Aug. 22, 1939

2,170,699

UNITED STATES PATENT OFFICE 2,170,699

FOUNTAIN PEN FILLING DEVICE

Owen R. Terry, Detroit, Mich.

Application February 12, 1936, Serial No. 63,648

41 Claims. (Cl. 226—63)

My invention relates generally to fountain pen filling devices, and more particularly to an inkwell which is operable automatically to fill a fountain pen.

The device of my invention comprises generally an inkwell having means for receiving the nib end of a fountain pen and making a sealed connection with the end of the connection, and further with means operated by the movement of the fountain pen with respect to the inkwell, for partially evacuating the reservoir of the pen and thereafter supplying ink to the space surrounding the nib of the pen so that the ink will flow into the reservoir of the fountain pen under atmospheric pressure. In my Patent No. 1,854,814, granted April 19, 1932, is disclosed a device of this general type. My present invention relates to various improvements and modifications of the device shown in said patent.

One of the objects of my invention is to provide an improved device for automatically filling fountain pens, which is adapted for attachment to an ordinary ink bottle, and which is simple in construction and may be manufactured economically.

A further object is to provide a fountain pen filling device of the character above set forth, in which the necessity for a piston sliding in a cylinder is obviated.

A further object is to provide a fountain pen filling device in which a flexible diaphragm is utilized to secure the pumping action, in a modified form, in which the diaphragm serves as a valve.

A further object is to provide a fountain pen filling device having a minimum number of parts, thereby reducing the cost of production and assembly.

A further object is to provide an inkwell of the above mentioned type in which a restricted passageway serves as a check valve.

A further object is to provide an improved fountain pen filling device which is very compact and of small dimensions so that it may be inserted through the neck of an ink bottle of standard dimensions.

A further object is to provide a fountain pen filling device in which a resilient means is tensioned upon the downward stroke of the fountain pen, the reservoir of the fountain pen is partially evacuated upon the upward stroke, and ink is admitted to the reservoir of the pen at or near the end of the upward stroke thereof.

A further object is to provide an improved nib receiving and sealing member.

A further object is to provide a fountain pen filling device in which the nib receiving part is in the form of a small auxiliary well, so that the device may be used as a dipping inkwell.

Other objects will appear from the following description, reference being had to the accompanying drawings, in which:

Figure 1 is a central vertical sectional view of the preferred form of my invention;

Figure 2 is a fragmentary plan view thereof taken on the line 2—2 of Figure 1;

Figure 3 is a perspective view of the spring seat ferrule;

Figure 4 is a central vertical cross-sectional view of a modified form of my invention;

Figure 5 is a fragmentary elevational view of the lower portion of the mechanism of Figure 4 looking in the direction of the line 5—5 of Figure 4;

Figure 6 is a central vertical sectional view of the body cylinder taken on a plane perpendicular to that of Figure 4;

Figure 7 is a transverse sectional view taken on the line 7—7 of Figure 4;

Figure 8 is a central vertical sectional view of a second modified form of my invention;

Figure 9 is a similar view of a third modified form of my invention;

Figure 10 is a fragmentary sectional view taken on the line 10—10 of Figure 9;

Figure 11 is a central vertical sectional view of a fourth modified form of my invention;

Figure 12 is a fragmentary sectional view of the upper end of the cylinder body of the construction shown in Figure 11;

Figure 13 is a fragmentary elevational view of the lower end of the cylinder of the construction shown in Figure 11;

Figure 14 is a central vertical sectional view of a fifth modified form of my invention;

Figure 15 is a view similar to Figure 14 showing the diaphragm in fully operated position;

Figure 16 is a fragmentary sectional view taken on the line 16—16 of Figure 15;

Figure 17 is a central vertical sectional view of a sixth modified form of my invention;

Figure 18 is a vertical sectional view of a seventh modified form of my invention;

Figure 19 is a transverse sectional view taken on the line 19—19 of Figure 18;

Figure 20 is a central vertical sectional view of an eighth modification of my invention;

Figure 21 is a sectional view taken on the line 21—21 of Figure 20; and

Figure 22 is a transverse sectional view taken on the line 22—22 of Figure 20.

This application is a continuation in part of my copending applications, Serial Nos. 531,890, filed April 22, 1931, and 605,845, filed April 18, 1932.

The device shown in Figures 1, 2 and 3 comprises a suitable reservoir or ink container 30, which may be made of glass phenol condensation product or other suitable material, and may be of any desired or preferred external form and finish. The container 30 has a cylindrical chamber 32 formed therein with an enlarged upper end, the chamber being of increased diameter at its upper end to receive the filling device. It is desirable also that the chamber have a recess 34 located centrally in its bottom to form a sump for the collection of sediment. The filling device proper is carried by a flanged ornamental ring 36 which is secured in the portion 33 of enlarged diameter at the upper end of the chamber by an annular gasket 38 of relatively soft rubber. The mounting ring 36 may be made of any suitable molded material, such as hard rubber or one of the plastics which is resistant to the ingredients of commercial ink. The mounting ring 36 is provided with a central bore 40 to receive the attaching sleeve 42, which may have a relatively tight sliding fit in the bore, the mounting ring 36 also providing a shoulder 44 forming a seat for a diaphragm cover 46.

The operating mechanism of the device comprises a body 48 of generally hollow cone shape to form a well 50 as an auxiliary reservoir for ink. The body is provided with a groove 52 extending along its external surface and terminating at its upper end in a slot 54 passing through the lip portion of the body. The body is covered by a jacket 56 which is preferably made of a flexible elastic rubber and fits snugly over the external surface of the body. The jacket has a downwardly extending bead 58 for cooperative engagement with the channel-shaped portion 60 of a flexible diaphragm member 62.

The diaphragm member is of soft rubber and is molded in such form that the annular walls 64 and 66 thereof will tend firmly to grip and clamp about the ridge 58 of the jacket and the upper edge of the body 48.

The diaphragm 62 is formed integrally with a pen seat 68 which is generally frusto-conical in shape. The lower end of the pen seat portion of the diaphragm is closed by a plurality of flaps 70. These flaps may be formed by cutting a pair of diametrical slits which are perpendicular to each other in the rubber. The upper end of the pen seat portion 68 is formed with a flange 71 which normally projects through a central opening 72 formed in the diaphragm cover 46 and which forms a convenient edge against which the nib of the pen may be wiped to remove surplus ink therefrom. An annular recess 74 is formed within the flange 71 to facilitate the removal of the surplus ink from the nib of the pen.

The pen seat portion of the diaphragm is reinforced by a ferrule 76, which is shown in detail in Figure 3. This ferrule has a curled lip 78 and has a pair of diametrically opposite generally semi-circular notches 80 cut in its lower end.

A coiled spring 82 is compressed between a shoulder 84 formed in the well portion 50 of the body 48 and the lip 78 formed in the upper end of the ferrule 76. The diaphragm 62 is thus normally held in the position in which it is shown in Figure 1, with the diaphragm in contact with the inner surface of the diaphragm cover 46, which inner surface is conformed snugly to receive and support the diaphragm.

The diaphragm cover 46 has internal threads 86 formed thereon for cooperative engagement with external threads 88 formed on the attaching sleeve 42. By screwing the sleeve 42 into the cover 46, an internal flange 90 formed on the sleeve 42 engages the portion 64 of the diaphragm and clamps the diaphragm 62, jacket 56 and body 48 together. The sleeve 42 has coarse threads 92 formed therein, for engagement with external threads of an ink bottle, when the device is to be attached to the container of this type. The chamber 32 is vented to the atmosphere through one or more grooves 94 provided in the supporting ring 36. There will ordinarily be sufficient irregularities in the contact between the lower edge of the cover and the shoulder 44, that these two parts will not form an air-tight seal. In operation, the container 30 will be partially filled with ink. The ink may be poured through the opening in the diaphragm 62, but it is preferable to remove the device proper from the supporting ring 36 and pour the ink directly into the chamber 32. When the inkwell has thus been supplied with ink, a fountain pen is inserted into the pen seat portion 68 of the diaphragm, with the edge of the section of the pen in sealing engagement with the inner surface of the pen seat. Since the pen seat is tapered, it is capable of making sealing contact with means having sections of different diameters. Since there is also considerable variation in the widths of the nibs and feed bars of various fountain pens on the market, I have made provision in the pen seat for receiving pens having the largest or widest nibs by cutting the recesses 80 in the metallic ferrule 76. When a pen with an unusually wide nib is inserted in the pen seat 68, the wide end portion of the nib will tend to cause the pen to turn slightly until the wide end portions are in alignment with the recesses 80 because the portion of the rubber seat which is not backed by the metal ferrule will stretch slightly and the nib will thus tend to twist if it is not held too tightly, seeking to move in a direction in which the resistance to insertion is least. The pen seat 68 is of sufficiently elastic rubber to permit the nib to deform the rubber of the seat into the recesses 80 and permit entrance of the nib sufficiently to permit the adjacent end of the section of the fountain pen to engage the seat. The flaps 70 are sufficiently flexible that they do not interfere with the insertion of the nib of the pen. When the pen is properly engaged with the seat 68, the pen is pressed downwardly thereby compressing the spring 82 aand forcing a large portion of the air within the well 50 into the chamber 32 of the container through the slot 54 to the passageway formed by the groove 52 covered by the jacket 56. The air as thus ejected to the chamber 32 will be vented to the atmosphere through the vent groove 94. Upon releasing the pen, the spring 82 will flex the diaphragm 62 upwardly into the position in which it is shown in Figure 1, thus causing a partial vacuum to be formed within the well 50. Ink will thus be forced under atmospheric pressure through the passageway 52 and slot 54 into the well. After one or two initial strokes, the well 50 will become filled with ink substantially to the level of the lower end of the slot 54. Thereafter when a fountain pen is inserted in the pen receiving seat 68 and the diaphragm reciprocated, the partial vacuum formed during the upward stroke of the diaphragm will be communicated to the reservoir of the fountain pen and exhaust or partially exhaust the contents thereof. The partial vacuum created upon the upward stroke of the diaphragm is gradually relieved due to the flow of ink from the chamber 32 through the passageway 52 into the well. The passageway 52 is of sufficiently small cross-sectional area that it will afford an appreciable restriction to the flow of ink and will permit the formation of a sufficiently high vacuum within the well 50 quite completely to exhaust the contents of the reservoir of the fountain pen. As the vacuum within the well 50 is gradually relieved by the upward flow of ink through the passageway 52, the ink will flow into the reservoir of the fountain pen, to fill, or partially fill, the latter.

When the fountain pen being filled is provided with a collapsible rubber ink sac, a single operation of the device will be sufficient completely to exhaust the contents of the fountain pen reservoir and to refill the reservoir with ink. In filling fountain pens of the reciprocating plunger type, two or more operations of the filling device may be necessary in order substantially to fill the reservoir of the pen. This is of course necessary because the air within the reservoir of the pen will expand as it is subjected to a partial vacuum. For example, if the amount of depression below atmospheric pressure were approximately one-half atmosphere, a fountain pen having rigid reservoir walls could be filled to approximately one-half its capacity upon a single operation of the device. Upon the second operation, it would be filled to three-quarters of its capacity, and upon the third operation to seven-eighths of its capacity, etc.

The ferrule 76 and the spring 82 are preferably made of a stainless steel or other alloy which is not affected by the corrosive ingredients of the ink.

As previously intimated, the device may be attached to an ordinary ink bottle, the neck of which is provided with external threads cooperable with threads 92. In order to maintain the interior of the ink bottle at atmospheric pressure, a vent 96 is provided in the lower surface of the flange 90.

In the modification shown in Figure 4, the inkwell comprises a bottle 110 having an externally threaded neck 112. This bottle may be of any suitable construction, and is shown as the ordinary bottle in which ink is sold. A cylinder body 114, which may be made of Celluloid, hard rubber or other suitable material not corroded by ink, most clearly illustrated in Figure 6, has a bottom 116 which is preferably formed integrally with the body and has its upper end portion of gradually increasing thickness. A pair of diametrical transverse slots 118 are formed in this thickened upper end portion so as to provide a plurality of slightly resilient fingers 120. The body has an outlet port 122 adjacent its lower end.

A piston 124 is slidable within the cylindrical bore 126 of the cylinder body 114, the piston preferably being formed of comparatively soft rubber and being integral with a normally cylindrical sleeve 128. The latter is rolled over the body 114 entirely to encompass the latter, and is held in place by its own resiliency. The piston 124 has a frusto-conical seat 130 against which the pen end of a fountain pen is adapted to make a sealed connection, as indicated in Figure 4 by the dotted lines. The piston has a central well 132 to receive the pen point. An annular groove 134 is formed around the piston 124 and communicates with the upper end of the well 132 through passageways 136. A passageway 138 connects the upper end of the well 132 with the cylinder 126 below the piston.

The body 114 has a flattened surface 140 in line with the outlet port 122, and the sleeve 128 has a crescent-shaped slit 142 cut therein adjacent the port 122 so that a flap 144 formed by this slit serves as an outwardly opening check valve over the outlet port 122. The body 114 has a plurality of inlet ports 46 which lie in registry with the annular groove 134 of the piston when the latter is in its normal upper position, the ports 146 communicating with grooves 148 formed in the side wall of the body 114. The grooves are of course covered by the sleeve 128 so as to form ink conducting passageways from the bottom of the bottle to the ports 146. The portion of the sleeve 128 which extends downwardly inside of the body 114 has a vent aperture 150, and the outer portion a vent 151, which permit the flow of air from the atmosphere to the inside of the bottle 110. If desired, the sleeve 128 may be slotted so as to facilitate moulding and assembling. Or, in certain instances it may be desirable to use a separate strip of soft rubber having its ends secured to the piston 124, in place of the sleeve. In these variations, the desired degree of elasticity may be readily obtained without making the part of such small dimensions as would render moulding difficult.

In operation, the bottle of ink is filled to the level as indicated in Figure 4, and the fountain pen filling mechanism forced into the bottle, the resilient tongues 120 pressing against the inner surface of the bottle neck 112 so as frictionally to clamp the mechanism within the bottle. The bottle will ordinarily have a screw-threaded cap with a suitable gasket of cork or other material threaded over the neck 112.

When it is desired to fill a fountain pen, the pen is inserted in the inkwell, as indicated in dotted lines in Figure 4, with its lower edge pressed firmly against the soft rubber seat 130 and the pen point projecting into the well 132. The pen is then moved downwardly, forcing the piston 124 to the bottom of the cylinder body 114. The sleeve 128 is sufficiently elastic to permit this movement and is sufficiently resilient again to draw the piston upwardly when the downward force on the fountain pen is removed. Upon the downward stroke, air or ink which is present in the cylinder 126 below the piston is forced outwardly through the port 122 and past the flap check valve 144. The downward pressure on the piston is relieved sufficiently to permit the elastic sleeve 128 to draw the piston upwardly, but sufficient force is exerted upon the pen to maintain a tight seal between the pen and the seat 130. In the construction shown the pen seat is of such taper that the end of the pen will be wedged in position against it, and application of a slight upwardly directed force will be necessary to unseat it.

During the upward movement of the piston 124, a partial vacuum is created in the cylinder 126 beneath the piston, this partial vacuum being communicated to the well 132 through the passageway 138. Due to the decreased pressure about the point of the pen, the sac in the pen will be collapsed under the influence of atmospheric pressure and the contents of the sac ejected into the well 132, the surplus, if any, flowing through the passageway 138 to the cylinder 126.

As the piston approaches the upper end of its stroke, the annular groove 134 will come in registry with the ports 146, and, due to the fact that the well is at less than atmospheric pressure, ink from the bottle will rush upwardly through passageways 148, ports 146 and passageways 136, into the well, whereupon the ink will be drawn into the sac reservoir of the fountain pen due to the resiliency of the latter, surplus ink flowing into the cylinder 126 through the passageway 138. When the sac has thus been filled, the pen may be removed from its sealing contact with the seat 130. It will be noted that the only portions of the fountain pen which will come in contact with the ink are the nib, the lower portion of the feed bar, and the lower end surface of the section.

Upon removal of the fountain pen, the well 132 will be filled with ink to the level of the openings of the passageways 136, the surplus ink flowing by gravity through the passageways 136 and 148 into the ink bottle. After filling a fountain pen, the device may thus be used with an ordinary dipping pen.

In Figure 8 is shown a modified form of the fountain pen filling device. In this modification the ink reservoir 160 is provided with a substantially cylindrical body 162 which has an enlarged head 164 tightly seated in an aperture 166 formed in the top of the reservoir 160. The body 162 has a cylindrical bore 168 in which a piston 170 is slidably mounted. The piston carries a frusto-conical soft rubber sealing member 172 which is adapted to make a sealed connection with the end of a fountain pen. This member has a plurality of sector-shaped flaps 174 formed integrally therewith, these flaps normally lying against each other to close the opening in the bottom of the member 172. The piston has a central bore 176 which is connected by passageways 178 with a peripheral annular groove 180. A passageway 181 connects the bore 176 with the cylinder 168 beneath the piston.

A well 182 which is secured to or formed integrally with the piston body 170 is centrally located in the bore 176 and is adapted to receive the pen point. A tension coil spring 184 has its upper end threaded into an internal helical groove 186 formed at the upper end of the cylinder 168 and has its lower end similarly threaded in a groove 188 formed in the external surface of the piston body. This spring thus normally holds the piston in the position shown in Figure 8. The cylinder body 162 has one or more passageways 190 formed in the wall thereof. The upper end of the passageway 190 terminates adjacent the annular groove 180 formed in the piston when the latter is in normal upper position, and the lower end of the passageway terminates adjacent the bottom of the reservoir 160. The bottom of the cylinder body 162 is closed by a cap 192, which may be pressed over the lower end of the body. An elbow passageway 194 is formed in the cap 192, the outer end of the passageway being normally closed by a gravity check valve 196. The latter is preferably made of glass or similar material and is prevented from moving more than a small distance from its seat by an annular rib 198 formed on the body 162. It is also confined against lateral movement by an upwardly extending flange 200 forming part of the body 192. The interior of the reservoir 160 is maintained at atmospheric pressure by means of a vent passageway 202 formed in the head 164.

The operation of the modified form shown in Figure 8 is substantially the same as previously described with reference to the structures shown in Figures 1 to 7, inclusive, the main difference being that the spring 184 is utilized to return the piston to normal position.

The modification shown in Figure 9 comprises a suitably shaped ink reservoir 210 having an aperture 212 formed in the top thereof. The body 214 is threaded into a head 216 which is fitted into the aperture 212, a soft rubber gasket 218 being interposed between the head and the reservoir 210 to assure a snug fit. The body 214 has an upper cylindrical bore 220 and a lower cylindrical bore 222 formed therein, the bores being separated by a wall 224 which serves as a guide for stem 226 formed integrally with a piston 228. The stem 226 has a bore 230 at its upper end to receive an obturator ring 232, which is preferably made of soft rubber and has a frusto-conical seating surface 234. A pen point receiving bore 236 communicates with the opening in the obturator 232 and communicates with longitudinal passageway 238 in the stem. The latter passageway has a lateral branch 240 leading to an annular groove 242 formed in the piston 228 and a small diameter diagonal branch 244 opening into the cylinder 222.

A collar 246 is threaded to the upper end of the stem 226 and forms a guide for the upper end thereof, suitable notches 248 being provided in the collar to permit venting of the upper cylinder 220 to the atmosphere. A compression coil spring 250 has its lower edge seated upon the wall 224 and its upper edge engaging beneath the collar 246, thereby normally holding the piston 228 and stem 226 in their uppermost positions, as shown in Fig. 9. A conduit 252 is secured in the body 214 and is adapted to permit flow of ink from the bottom of the reservoir 210 into the upper end of the cylinder 222. A vent passageway 254 is formed in the body to prevent the formation of a vacuum in the upper end of the cylinder 222 as the piston 228 is moved downwardly. The ink reservoir is vented to the atmosphere through a port 255 formed in the head 216.

The lower end of the cylinder 222 is closed by a cap 256, the cap having a sidewardly extending lug 258. An elbow passageway 260 communicates at one end with the lower end of the cylinder 222 and has its other end normally closed by a gravity check valve 262 which is seated in a recess 264 formed in the lug 258. The portion of the lug 258 above the valve 262 is apertured as shown in Fig. 10, to permit free escape to the reservoir of ink and air forced past the check valve 262.

The modified construction shown in Fig. 9 operates in substantially the same manner as the devices shown in Figs. 1 to 8, inclusive, and previously described. Upon inserting a fountain pen with its end seating against the surface of the obturator 232, the piston and stem may be forced downwardly, thereby ejecting the contents of the lower cylinder 222 through the passageway 260 and past the check valve 262. Upon slightly relieving the force applied to the fountain pen, the spring 250 will force the piston and stem upwardly, thereby creating a partial vacuum in the cylinder 222 which will be communicated to the pen point through the passageways 244 and 238, thereby exhausting the contents of the reservoir of the pen. At the end of the upward stroke of the piston stem, the groove 242 will come in registry with the end of the conduit 252 and atmospheric pressure in the ink reservoir 210 will force the ink therein through the conduit 252 and passageways 240 and 238 into the fountain pen reservoir. Any ink leaking into the cylinder 222 above the piston 228 upon the downward stroke thereof will be ejected at the end of the upward stroke through the passageway 254.

The modified construction shown in Figs. 11, 12 and 13 is generally similar to the constructions previously described and comprises a cylinder 270 having a closed bottom 272 and an inlet duct 274. The upper end of the cylinder has an inwardly extending flange 276, the cylinder having a plurality of slots 278 formed therein so that the upper end of the cylinder may be constricted in diameter. The cylinder is preferably made of hard rubber or Celluloid which has sufficient resiliency to permit such constriction. The bottle 280 in which the cylinder is mounted has a neck 282 with a cylindrical opening 284 of slightly larger diameter than the outside diameter of the cylinder 270. A bead 286 is formed at the upper end of the opening and holds the cylinder in place within the bottle.

A piston 288 is freely reciprocable within the cylinder 270, having an obturating seat 290 of soft rubber secured therein. This seat is frusto-conical so as to be adapted to receive pens of different sizes. A well 292 is formed in the piston and is adapted to receive and contain a small quantity of ink sufficient for use of the inkwell with ordinary pens. The piston has an annular groove 294 formed therein, the groove communicating with the well 292 through a pair of passageways 296. A restricted duct 298 connects the groove 294 with the cylinder beneath the piston. The lower surface of the piston has a recess 300 formed therein to receive a conical compression spring 302, the lower end of which is centered around a boss 304 formed on the bottom 272. The spring 302 is preferably coated with an acid resisting composition such as a thermoprene base paint or is made of a suitable stainless steel alloy. As an alternative the spring may have a rubber coating applied thereto by the process of electrodeposition.

The bottom 272 is provided with an outlet duct 306, the outer end of which is closed by a flexible flap check valve 308. As shown in Fig. 13, the cylinder has a flattened portion 310 and a depending lug 312 spaced from the flattened surface 310, a slot 313 being thus formed to receive and hold the upper end of the flap check valve 308. The latter is preferably made of a soft flexible rubber so that its upper end may be stretched, slid into the slot 313, and then permitted to expand in the slot, thus being firmly held therein. Other forms of check valves may, however, be used.

It will be noted that the upper end of the cylinder is normally flared outwardly as shown in Fig. 12. In inserting the cylinder in the ink bottle the piston 288 is first pressed toward the bottom of the cylinder and the cylinder then forced into position as shown in Fig. 11. The upper end of the cylinder is sufficiently elastic so that it will be compressible sufficient to pass the bead 286 on the bottle and thereafter expand so as to lock the cylinder in the bottle. After it is thus in position it will be extremely difficult to remove the cylinder from the bottle. When the cylinder is thus expanded and the piston permitted to move to its uppermost position, there will be some clearance between the piston and cylinder as indicated at 314. The slots 278 form air vents for the interior of the ink bottle and also permit draining back to the interior of the bottle of any ink which may have leaked past the piston 288.

The device of Figs. 11 to 13, is operated in the same manner as the constructions previously described. During the downward stroke the spring 302 will be compressed and the several coils thereof nest within one another within the recess 300. During this downward stroke the contents of the cylinder will be ejected past the check valve 308 and during the up-stroke the vacuum formed in the cylinder beneath the piston will be communicated to the well 292, and hence to the ink reservoir of the fountain pen through passageways 298, 294 and 296, thereby exhausting the pen reservoir. The well 292 will normally contain ink so that the operation of the device will be very efficient. It will be understood that the reduction of the amount of air in the device around the pen point will result in corresponding increase in the effectiveness of the vacuum produced. As th episton approaches its uppermost position shown in Fig. 11, the groove 294, will uncover the end of the passageway 274 and, due to the partial vacuum therein, ink will flow from the bottle through this passageway into the well 292 and hence to the fountain pen reservoir. A certain amount of the ink thus drawn in will flow into the cylinder through the restricted passageway 298 and this will not materially interfere with the effective operation of the device. It will be noted that the inwardly projecting flange 276 will limit the upward movement of the piston.

The filling device of Figure 14 is shown as incorporated in a bottle 410, which may be of any suitable construction. The filling device comprises a body 412 which is inserted in the neck of the bottle 410 in lieu of the usual stopper. The body may be made of any suitable material but preferably of a semi-hard rubber. It is provided with a central cylindrical well 414, the upper end of which is flared outwardly as indicated at 446. A passageway 415 is formed in the body 412 to receive an ink supply tube 418, which is preferably made sufficiently long to reach to the bottom of the ink bottle 410. The lower end of this tube 418 is preferably cut at an angle so as to eliminate the possibility of being closed by the bottom of the bottle. A duct 420 communicates with the passageway 415 and opens into the flared portion 416 of the well.

A discharge passageway 422 has its upper end open to the well at the lower end of the flared portion 416, the lower end of the passageway 422 being normally closed by a flap 424 which is formed from the body 412 by a cut 426 extending transversely through the passageway. The material of which the body 412 is formed is sufficiently flexible and resilient so that the flap 424 serves as an effective check valve.

A diaphragm 428 which is preferably made of a fairly elastic soft rubber, has a peripheral flange 430 of increased thickness which fits into a complementary annular groove 432 formed in the flange portion 434 of the body 412. The diaphragm is secured in the body by means of a ferrule 436, the lower end 438 of which is turned inwardly beneath the flange portion 434 of the body. The ferrule is provided with a threaded neck 440 which may be closed by a suitable cap 442. The diaphragm 428 has a depending hollow frusto-conical pen seat 444. This seat portion 444 is preferably of sufficient thickness so that it will not be appreciably deformed when a fountain pen is pushed into it in the manner as indicated by the end portion of the fountain pen 446 illustrated in dotted lines in Fig. 14.

When it is desired to fill a fountain pen, either of the sac or the sacless type, the cap 442 is removed and the pen inserted as indicated by the dotted lines of Fig. 14. Thereafter, the pen is pressed downwardly, thus displacing the air in the well 414, 416 through the passageway 422 and past the check valve flap 424. Shortly after the commencement of the downward stroke of the fountain pen, the diaphragm 428 will be tightly stretched over the upper end of the duct 420 and seal the latter. The pen will be moved downwardly until the diaphragm will have been flexed and stretched sufficient to displace substantially all of the air contained in the well, and in addition possibly eject some of the ink which will normally be present in the well 414. At the lower end of the stroke the pen may be released, whereupon the diaphragm will contract to draw the pen seat portion 444 thereof upwardly. During the initial operation of this movement, the end of the duct 420 will be closed by the diaphragm and a partial vacuum thereafter formed within the well. This partial vacuum will be effective for withdrawing or exhausting the contents of the reservoir of the fountain pen. In the sac type the differential pressure will cause collapse of the sac and ejection of the contents thereof into the well 414. In the sacless type of pen the reduced pressure within the well will result in expansion of the air in the reservoir of the pen. As the diaphragm reaches the upper limit of its stroke, it will uncover the end of the duct 420, whereupon the ink within the bottle 410 will be forced upwardly through the tube 418, passageway 415 and duct 420 into the well 414, 416. The well will therefore again be at substantially atmospheric pressure and consequently the ink will be forced into the reservoir of the pen. In the sac type the expansion of the rubber sac will cause the flow, while in the sacless type the difference in pressures of the contents of the well 414, 416 and of the reservoir of the pen will cause this flow of ink into the reservoir.

The well 414 will normally be filled with ink up to substantially the level of the upper end of the passageway 422 so that there will always be sufficient ink therein to permit use of the device with ordinary pens as a dipping inkwell. The cap 442 will of course prevent the ink in the well from evaporation. The body 434 fits fairly snugly in the neck of the body but the fit is not sufficiently tight to prevent the venting of the interior of the bottle with the atmosphere. The contents of the bottle 410 will therefore always be at substantially atmospheric pressure.

The construction shown in Figure 15 is similar to that shown in Figure 14 and is illustrated as applied to an ink bottle of a slightly different type. In view of the similarity of these two constructions, similar reference characters have been applied to the parts of the construction of Figure 15 which are similar to the corresponding parts of the embodiment of Figure 14. The diaphragm 428 is, however, held in place by an apertured cap 450 which has a threaded flange 452 so that it may be screwed to the neck 454 of the ink bottle. The body 456 has an annular flange 458 which embraces a rib 460 formed on the upper surface of the bottle neck. If desired, a suitable stopper 462 fitting into the pen seat 444 may be provided to seal the bottle when the device is not in use.

The construction shown in Fig. 17 is substantially identical with that shown in Fig. 15 except in the shape of the diaphragm, and in the fact that a spring is provided to aid in returning the diaphragm to normal position. In so far as the parts shown in this figure are similar to those previously described, similar reference characters have been applied to the drawing. The diaphragm 470 in its normal position is dome-shaped and has a pen seat 472 formed integrally therewith. A compression coil spring 474 made of a suitable alloy which is not affected by the corrosibe constituents of different inks, has its lower end seated in the bottom of the well 414 and its upper end engages the diaphragm 470 and is held in central position by the depending portion of the pen seat 472. In this construction the inlet duct 476 has the opening at its upper end located at the outwardly sloping surface 478 of the body 480 so that it will be closed by the adjacent portion of the diaphragm shortly after the downward stroke of the diaphragm is initiated.

In the construction shown in Figs. 18 and 19, a wide rubber band 482 is utilized in place of the spring for aiding in returning the diaphragm to normal position. The body 484 has a pair of slots 486 formed in the annular flange 488 thereof, to receive the rubber band 482. The latter is formed with an opening 490 which fits around the depending portion 492 of the pen seat 472. The rubber band has a crescent-shaped slot 494 formed adjacent the lower end of an outlet passageway 496 formed in the body 498 to form a flap valve 500. The rubber band itself forms the means for closing the upper end of the inlet duct 502 during the initial portion of the downward stroke of the diaphragm. In operation the rubber band aids in returning the diaphragm and pen seat to their normal positions, as shown in Fig. 18, and at the same time functions as a valve for the end of the duct 502 and as a check valve for the end of the outlet passageway 496. The rubber band 482 is held in place not only by the slots 486 but also by reason of the fact that the tube 418 passes through an opening in the rubber band and thus prevents it from shifting its position relative to the body 498. If desired, portions of the rubber band may be cemented to the body 498 and it is desirable, although not essential, that the rubber band also be cemented to the lower end of the pen seat 472.

In the construction shown in Figs. 20, 21 and 22, the filling device is arranged to be supported by the neck of a bottle and to lie flush or beneath the upper end of the bottle neck.

The device comprises a body 510 having a well 512 formed therein. The body may be made of any desired material, such as a hard rubber composition, Celluloid, wood, phenol condensation product, etc. The pen seat 514 is reciprocable in the upper enlarged diameter portion 516 of the well 512. The pen seat is formed integrally with an elastic diaphragm 518 which extends over the upper end of the body and downwardly along the side thereof. The downwardly extending portion of the diaphragm may be cemented to the outside of the body 510, or the fact that it is compressed between the inside wall of the neck of the bottle and the body may be relied upon to hold it in place.

The body is provided with a longitudinal passageway 520 into the lower end of which an air tube 522 is fitted. The passageway 520 opens into an annular groove 524 formed adjacent the upper edge of the enlarged portion 516 of the well. A discharge passageway 526 leads from a point adjacent the middle of the enlarged portion 516 of the well to an outlet port 528. An arcuate groove 530 is formed in the external surface of the body 510 at the outlet port 528, the groove serving as a recess for a C-shaped valve 532. The latter extends sufficiently beyond the center of the body 510 and is made of a resilient hard material so that it will resiliently be held in the place over the outlet port 528.

Upward movement of the pen seat 514 is limited by engagement of a pair of pins 531 which are secured in the body 510, with the upper surface of an annular flange 533 formed adjacent the lower end of the pen seat.

The operation of the modified form of my invention shown in Figs. 20, 21 and 22 is substantially the same as the operation of the construction shown in Fig. 14. Shortly after the commencement of the downward stroke of the pen seat, the diaphragm 508 will cover the groove 524, and the contents of the well will therefore be ejected through the discharge passageway 526, past the check valve 532. The diaphragm will be returned to its normal position due to the elasticity of the diaphragm itself, and during the major portion of the return stroke the diaphragm will cover the groove 524, whereupon a pressure vacuum will be formed in the well. Shortly prior to the completion of the return stroke, the diaphragm will uncover the groove 524, and ink from the bottle or other container will be forced by atmospheric pressure through the tube 522, passageway 520 and groove 524 into the well, and thence to the reservoir of the fountain pen being filled.

In all of the modifications of my invention, the bottle neck opening is preferably not exactly cylindrical, or may have a groove formed therein, so that the filling device will not completely close the neck but will leave a passageway of small cross-sectional area for venting purposes.

The filling devices may be conveniently used as ordinary inkwells since the walls will ordinarily contain sufficient writing fluid to permit a pen to be dipped therein. The wells are of sufficient capacity so that, if desired, a fountain pen may be conveniently filled therefrom in the usual manner, using the filling mechanism incorporated in the pen.

It will be observed that in all of the various embodiments of my invention disclosed herein, the fountain pen is utilized as the means for reciprocating a piston or diaphragm which is effective to change the volume of a chamber. In some of the embodiments, the contents of the chamber are ejected into the ink container past a check valve, whereas in the embodiments of Fig. 1, the ink flows through a relatively longer narrow passageway which performs the function of the check valve in restricting flow of ink from the ink container to the chamber. After the contents of the chamber have been discharged into the container (either in whole or in part), the piston or diaphragm is moved to enlarge the chamber to cause a partial vacuum therein. This partial vacuum is communicated to the reservoir of the fountain pen and withdraws the contents therefrom. The partial vacuum in the chamber is then relieved by permitting ink to flow from the container into the chamber. This ink immerses the nib of the fountain pen so that as the partial vacuum is relieved, the ink will flow into and fill the reservoir of the pen.

In the construction shown in Figs. 1 to 3 inclusive, the assembly of the parts is readily effected since the jacket is resiliently clamped to the body by means of the channel-shaped part of the diaphragm. Because of the ease of assembly and the simplicity of the construction, the embodiment of Figs. 1 to 3 inclusive is preferred, although the remaining embodiments are practical in operation.

While I have illustrated and described a number of embodiments of my invention, other modifications may be made without departing from the spirit of the invention, and I do not wish to be limited to the precise details set forth but desire to avail myself of all changes within the scope of the appended claims.

What I claim as new and desire to secure by Letters Patent of the United States is:

1. In a filling device for fountain pens, the combination of an ink container, a cylinder associated with said container, a piston reciprocable in said cylinder, apertured sealing means carried by said piston, resilient means normally holding said piston at the upper end of said cylinder, said piston having a passageway leading from the apertured sealing means to the bottom of the piston, said piston also having ink inlet passageways formed therein, means for permitting escape of ink from the lower end of said cylinder to said container and preventing flow in the reverse direction, and means for admitting ink to said ink inlet passageways in said piston when said piston is in its normal upper position.

2. In combination, an ink container having a neck with an opening therein, vacuum creating means for exhausting the contents of a fountain pen reservoir and filling the same with ink, said means including a member having a plurality of resilient fingers at the upper end thereof, said means being inserted in said opening in said container with said resilient fingers engaging against the wall of said neck opening, thereby to hold the means stationary within said container.

3. In combination, a hollow cylindrical member having an inlet port intermediate the ends thereof, and a check valved outlet port adjacent the bottom thereof, means for closing the bottom of said member, a piston reciprocable in said member, resilient means for moving said piston upwardly, and means carried by said piston for making a sealed connection with a fountain pen reservoir.

4. In a device for filling fountain pens, the combination of a source of ink supply, a chamber associated therewith and having an outlet near the bottom thereof, plunger means operable upon downward movement of a fountain pen for making a sealed connection between the reservoir of the fountain pen and said chamber, said means having a passageway therein, a check valve normally closing said outlet of said chamber, and means for admitting ink to said passageway in said plunger means when said plunger means is near the upper end of its stroke.

5. In a device for filling fountain pens, the combination of a hollow cylindrical body, means for closing one end of said body to form a chamber, a check valve for permitting discharge of ink from said chamber but preventing flow in the reverse direction, a piston reciprocable in said body, said piston being operable upon downward movement thereof to eject the contents of said chamber and upon upward movement thereof to form a partial vacuum therein, means on said piston for making a sealed connection with the fountain pen to be filled, means for admitting ink to said piston when the latter is near the upper end of its stroke, and resilient means for moving said piston upwardly.

6. In a device for filling fountain pens, the combination of a piston and cylinder, elastic means for holding said piston at the upper end of said cylinder, an annular obturating member carried by said piston for effecting a sealed connection with the reservoir of a fountain pen to be filled, check valve means permitting free discharge from the lower end of said cylinder, and means for admitting ink to the opening in said obturating member when the piston is near the upper end of its stroke.

7. In a fountain pen filling device, the combination of an ink reservoir, a cup-shaped member in said reservoir, said member having a check valved outlet at its lower end and an inlet from said reservoir at a point intermediate the ends of said member, a piston having a well formed therein and reciprocable in said member, said piston having a passageway to connect said inlet with said well when said piston is in its upper position and a restricted passageway connecting said last named passageway with the interior of said cup, means surrounding said well to make a sealed connection with the pen end of a fountain pen, and a compression spring between said piston and the bottom of said member.

8. In combination, a bottle having a neck with an inwardly extending bead at its upper end, a hollow closed end cylindrical body, said body having a plurality of resilient fingers at its upper end and an ink duct leading from its lower end to an intermediate point in the interior thereof, said fingers having inwardly directed flanges, a piston reciprocable in said body and held therein by the flanges on said fingers, and a spring compressed between the lower end of said body and the lower surface of said piston.

9. In an inwell, the combination of an ink container, a member mounted for vertical movement within said container, said member having means for making a sealed connection with the reservoir of a fountain pen to be filled, means forming a chamber to receive said member, outwardly opening check valve means associated with said chamber to permit flow therefrom, and resilient means for moving said member upwardly thereby to create a partial vacuum in said chamber.

10. In an inkwell, the combination of a bottle, a fountain pen filling mechanism, and cooperative means for holding said mechanism within said bottle; said mechanism comprising a body having a chamber therein adapted to contain ink, a member movable relative to said chamber to discharge the contents thereof, a check-valved discharge passageway provided for flow from said chamber to said bottle, means associated with said member for making a sealed connection with the reservoir of a fountain pen, resilient means for retracting said member, and means for conveying ink from said bottle to said member when the latter has substantially completed its retractile stroke.

11. In a device for filling fountain pens, the combination of a chamber, a movable wall having a portion thereof reciprocable in said chamber, an annular obturating member associated with said movable wall for effecting a sealed connection between the reservoir of a fountain pen to be filled and the interior of said chamber, check valve means permitting free discharge from the lower end of said chamber, and means for conducting ink to a point adjacent the obturating member in said movable wall when said wall is retracted a predetermined distance from the bottom of said chamber.

12. A fountain pen filling device comprising a body having a chamber therein, a movable wall substantially closing the upper end of said chamber and having a part thereof secured to said body, said movable wall having an opening at substantially the center thereof and having a sealing seat formed about said opening for making an air-tight connection with the reservoir of a fountain pen, a check valve at the lower end of said body to permit flow of fluid from said chamber and to prevent return flow, and means for supplying ink to said chamber at a point adjacent the opening in said movable wall when said wall has been retracted a predetermined distance.

13. In a fountain pen filling device, the combination of a body having a chamber therein, a part forming a wall of said chamber movable to decrease the size of said chamber and having means for making a sealed connection with the nib end of a fountain pen, resilient means to move said part in a direction to increase the size of said chamber, means for admitting ink to said chamber, and check valved means providing a passageway for the discharge of ink from said chamber.

14. In a fountain pen filling device, the combination of an ink container, a body carried thereby, said body having a chamber therein, a flexible member closing the upper end of said chamber, said member having means for making a sealed connection with the nib end of a fountain pen to be filled upon reciprocation of said member, means operable to cause the formation of a partial vacuum in said chamber and thus partially to exhaust the reservoir of a fountain pen pressed against said sealing means, and means for admitting ink from said container to said chamber thereby to fill the partially exhausted reservoir of the fountain pen with ink.

15. In a fountain pen filling device, the combination of an ink container, a body carried by said container and having a chamber therein, a part forming a wall of said chamber and movable in one direction to eject a portion of the contents of said chamber, said part having means for making a sealed connection with the nib end of a fountain pen, resilient means for forcing said part in the opposite direction to form a partial vacuum in said chamber, and a passageway in said body for conducting ink from said container directly to said chamber.

16. In a device for filling fountain pens, the combination of an ink container, a body member detachably carried by said container, said body having a well formed therein, a passageway connecting the lower portion of said ink container with the upper end of said well, a diaphragm having an apertured pen seat formed therein secured to said body at the upper end thereof, a discharge passageway leading from said well to said container, and a check valve associated with said discharge passageway.

17. In a device of the class described, the combination of a body member having a well formed therein, a diaphragm mounted over the upper end of said body, said diaphragm having an apertured pen seat formed integrally therewith, a passageway for admitting ink to a well in said body, and a check valved passageway for discharging ink from said body, said diaphragm being arranged to close said inlet passageway during the major portion of the operative stroke of said diaphragm and to be uncovered by the latter shortly prior to the completion of the return stroke of the diaphragm.

18. In a fountain pen filling device, the combination of a body having a well formed therein, means for supplying ink to said well, a passageway in said body for discharging ink therefrom, a check valve normally closing the outlet end of said passageway, a diaphragm closing the end of said well, said diaphragm having means for making a sealed connection with a fountain pen associated therewith, and a spring for moving said diaphragm in one direction.

19. A fountain pen filling device adapted to be detachably secured in a bottle of ink, comprising a body having a flange engageable with the neck of a bottle to limit the extent of insertion therein, said body having a well formed therein, a diaphragm secured to said body over said well, said diaphragm having an apertured pen seat formed therein, a tube extending downwardly from said body into the ink contained in the bottle and communicating through a passageway with said well, an outlet duct for discharging fluid from said well to the bottle, and a check valve normally closing said outlet duct.

20. In combination, an ink bottle, and a fountain pen filling device removably secured in said bottle, said device comprising a body fitting within the neck of said bottle, said body having a well formed therein, an inlet conduit for conducting ink from said bottle to said well, a check-valved outlet passageway leading from said well to said bottle, and a flexible diaphragm secured to said body over said well, said diaphragm having means thereon for forming a sealed connection with the end of a fountain pen and arranged to close said inlet conduit when forced downwardly.

21. A fountain pen filling device comprising a body having a central well formed therein, a diaphragm having its peripheral edges secured to said body, said diaphragm having means for making a quick detachable sealed connection with a fountain pen, an outlet conduit for the discharge of writing fluid from said well, and an inlet conduit through which writing fluid may be supplied to said well, the end of said inlet conduit being positioned for closure by said diaphragm when the latter is moved downwardly.

22. In a fountain pen filling device, the combination of a hollow body, means for securing said body to an ink bottle, a diaphragm closing the end of said hollow body, said diaphragm having an apertured pen seat formed therein, a spring for moving the central portion of said diaphragm outwardly, inlet and discharge conduits communicating with said hollow body, and an outwardly opening check valve associated with said discharge conduit.

23. In a fountain pen filling device, the combination of a bottle, a body detachably secured thereto, said body having a well formed therein, means for conducting ink from said bottle to said well, a check-valved discharge conduit leading from said well to said bottle, a flexible diaphragm having an apertured pen seat formed therein and extending across the end of said body, and resilient means to move said diaphragm outwardly.

24. A fountain pen filling device adapted to be detachably secured in a bottle of ink, comprising a body having a well formed therein, a diaphragm secured to said body, said diaphragm having an apertured pen seat formed therein, a tube extending from said body into the ink contained in the bottle and communicating with said well, an outlet conduit connecting said well to the bottle, and a check valve in said outlet conduit.

25. In combination, an ink bottle, and a fountain pen filling device mounted in said bottle, said device comprising a body having a well formed therein, an inlet conduit for conducting ink from said bottle to said well, a check-valved outlet passageway leading from said well to said bottle, and a flexible diaphragm secured to said body over said well, said diaphragm having means for forming a sealed connection with the end of a fountain pen.

26. A fountain pen filling device comprising a body having a well formed therein, and a diaphragm secured to said body, said diaphragm having means for making a quick detachable sealed connection with a fountain pen, said body having an outlet conduit for the discharge of ink from said well and an inlet conduit through which ink may be supplied to said well, the end of said inlet conduit being positioned so as to be closed by said diaphragm when the latter is moved downwardly.

27. In a fountain pen filling device, the combination of a hollow body, means for supporting said body in an ink bottle, a diaphragm closing the end of said hollow body, said diaphragm having an apertured pen seat formed therein, resilient means for moving the central portion of said diaphragm outwardly, said body having inlet and discharge conduits, and an outwardly opening check valve associated with said discharge conduit.

28. In a fountain pen filling device, the combination of a bottle, a body associated therewith, said body having a well formed therein, means for conducting ink from said bottle to said well, and a check-valved discharge conduit leading from said well to said bottle, and a flexible elastic diaphragm having an apertured pen seat formed therein and extending across the end of said body.

29. In a filling device for fountain pens, the combination of an ink bottle, a pair of members forming an expansive chamber therebetween, a ferrule for clamping both of said members to the neck of said bottle, one of said members having an opening therein through which the nib of a fountain pen to be filled may be projected, said last named member having means to form a seal against the end of the barrel of the pen, the other of said members forming a well to receive the nib of the fountain pen, one of said members being manually operable by reciprocation thereof by power derived from movement of the fountain pen, to expand the chamber between the members and thus partially to exhaust the contents of the reservoir of the pen, and a conduit connecting said well and the bottle to conduct ink from the latter to the former upon creation of a partial vacuum in said chamber.

30. In a fountain pen filling device, the combination of an ink container, a body carried by said container and having a chamber therein, a part forming a wall of said chamber and movable in one direction to eject a portion of the contents of said chamber, said part having means for making a sealed connection with the nib of a fountain pen, a spring for forcing said part in the opposite direction to form a partial vacuum in said chamber, and a restricted passageway between the lower portion of said ink container and said chamber, said passageway offering sufficient resistance to the flow of ink from the container into said chamber to cause the formation of an appreciable partial vacuum in said chamber.

31. In a device for filling fountain pens, the combination of an ink container, a body member detachably secured to said container and having a part projecting thereinto, said body having a well formed therein, a restricted passageway connecting the lower portion of said ink container with the upper end of said well, a diaphragm having an apertured pen seat formed therein secured to said body at the upper end thereof, and a spring for moving a portion of said diaphragm in one direction, said spring being sufficiently strong to move said diaphragm to create a partial vacuum in said well despite the flow of ink from said container to said well through said restricted passageway.

32. In a fountain pen filling device, the combination of a well, an apertured pen seat for receiving the nib end of a fountain pen and making an air-tight seal with the pen section, a ferrule surrounding said pen seat and having diametrically opposite recesses formed in the lower end thereof to receive the widest portion of the nib of a fountain pen, and a spring engaging said ferrule and constructed and arranged to move said pen seat in one direction.

33. In a fountain pen filling device, the combination of an ink container, a body carried by said container and having a chamber therein, a part forming a wall of said chamber and movable in one direction to eject a portion of the contents of said chamber, said part having means for making a sealed connection with the nib end of a fountain pen, resilient means for forcing said part in the opposite direction to form a partial vacuum in said chamber, and a conduit for conducting ink from said container to said chamber.

34. In a device for filling fountain pens, the combination of an ink container, a body member detachably carried by said container, said body having a well formed therein, a conduit connecting the lower portion of said ink container with said well, and a flexible diaphragm having an apertured pen seat formed therein at its center, and having its outer edge secured to said body at the upper end thereof, said diaphragm forming a closure for the top of said well, and said pen seat being formed to engage the end of the barrel section of a fountain pen while the aperture therein permits the passage therethrough of the nib of the fountain pen.

35. In a device of the class described, the combination of a body member having a well formed therein, a diaphragm mounted over the upper end of said body and forming a closure for the top of said well, said diaphragm having an apertured pen seat formed integrally therewith, a conduit for supplying ink to the well in said body, said conduit having its upper end positioned beneath said diaphragm, said diaphragm being arranged to close the upper end of said conduit during the major portion of the operative stroke of said diaphragm and to uncover the latter shortly prior to the completion of its return stroke.

36. In a filling device for fountain pens, the combination of an ink container, a well therein formed to receive the nib of a fountain pen, means for conveying ink from said container to said well, an element movable with respect to said well and having an apertured seat for engagement with the end of the barrel section of a fountain pen, said element being in substantially air-tight connection with said well and operable upon movement in a direction away from said well to cause a partial vacuum in said well, thereby to exhaust the contents of the reservoir of a fountain pen pressed against said seat.

37. A fountain pen filling device comprising a body having a central well formed therein, a diaphragm having its peripheral edges secured to said body, said diaphragm having means for making a quick detachable sealed connection with a fountain pen, and an inlet conduit through which writing fluid may be supplied to said well, the end of said inlet conduit being positioned for closure by said diaphragm when the latter is moved downwardly.

38. In a fountain pen filling device, the combination of a hollow body, means for securing said body to an ink bottle, a diaphragm closing the end of said hollow body, said diaphragm having an apertured pen seat formed therein, a spring for moving the central portion of said diaphragm outwardly, and an inlet and discharge conduit communicating with said hollow body.

39. In a fountain pen filling device, the combination of an ink container, a body detachably secured thereto, said body having a well formed therein, a conduit leading from said container to the upper part of said well, a flexible diaphragm having an apertured pen seat formed therein and extending across the end of said body, flexible flaps on said diaphragm normally closing the aperture therein, said flaps being substantially at the normal level of the ink in said well, and resilient means to move said diaphragm outwardly.

40. In a filling device for fountain pens, the combination of an ink container, a well supported by said container and formed to receive the nib of a fountain pen, conduit means of relatively small cross-sectional area for conducting ink from said container to said well, an element movable with respect to said well and having an apertured seat for engagement with the end of the barrel section of a fountain pen, said element being in substantially air-tight connection with said well and operable upon movement in a direction away from said well to cause a partial vacuum in said well, thereby to exhaust the contents of the reservoir of a fountain pen pressed against said seat and to cause flow of ink from said container to said well through said restricted conduit means.

41. A fountain pen filling device comprising an ink container, a body having a well formed therein, and a member forming a movable wall for said well, said member having means for making a quick detachable sealed connection with a fountain pen, said body having a conduit for connecting said well with said container, the well end of said conduit being positioned so as to be closed by said member when the latter is moved downwardly.

OWEN R. TERRY.